Oct. 3, 1939.  J. D. FERRY  2,174,556
COOKING APPARATUS
Filed Dec. 3, 1936  3 Sheets-Sheet 1
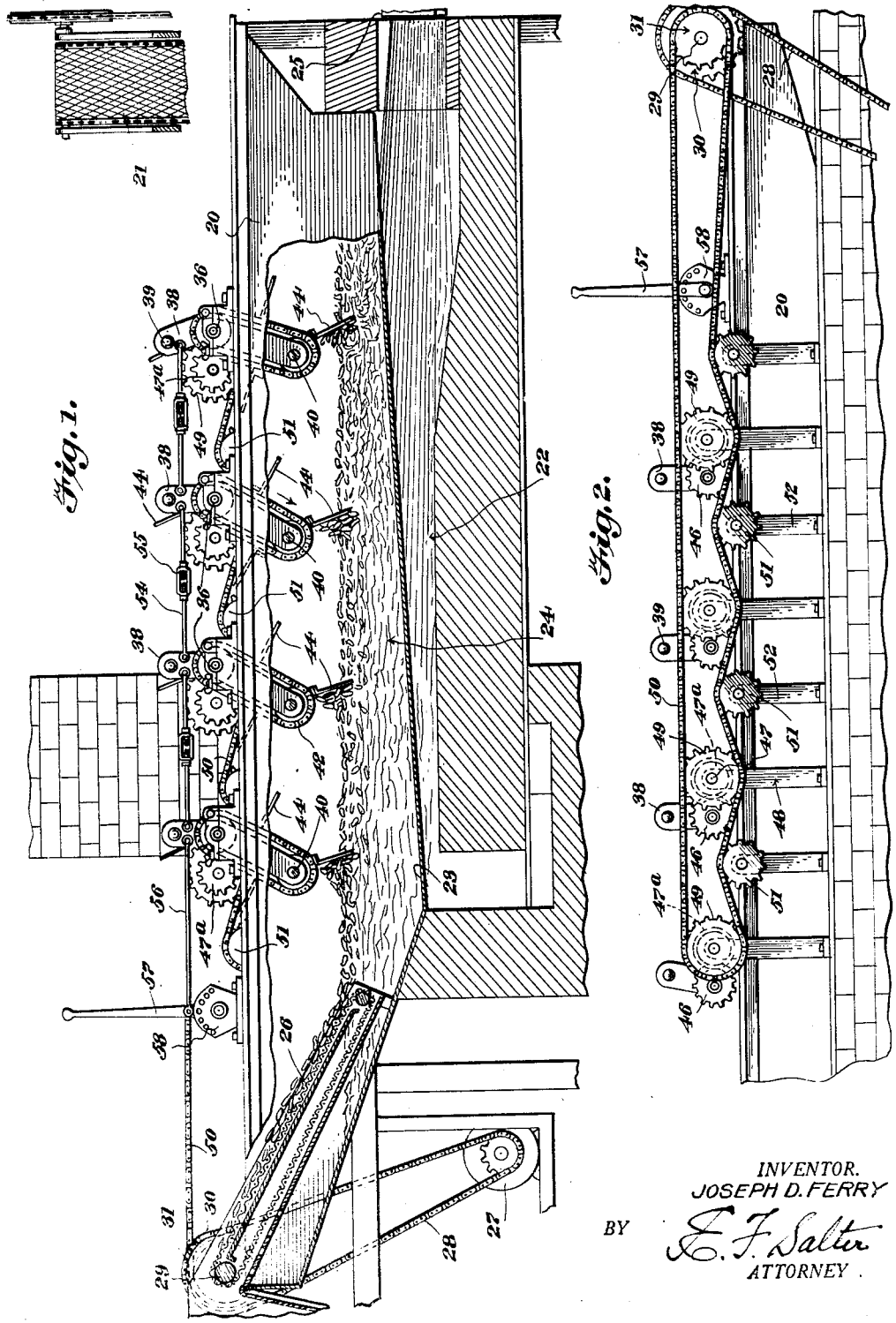
INVENTOR.
JOSEPH D. FERRY
BY
E. F. Salter
ATTORNEY.

Oct. 3, 1939.  J. D. FERRY  2,174,556
COOKING APPARATUS
Filed Dec. 3, 1936   3 Sheets-Sheet 2
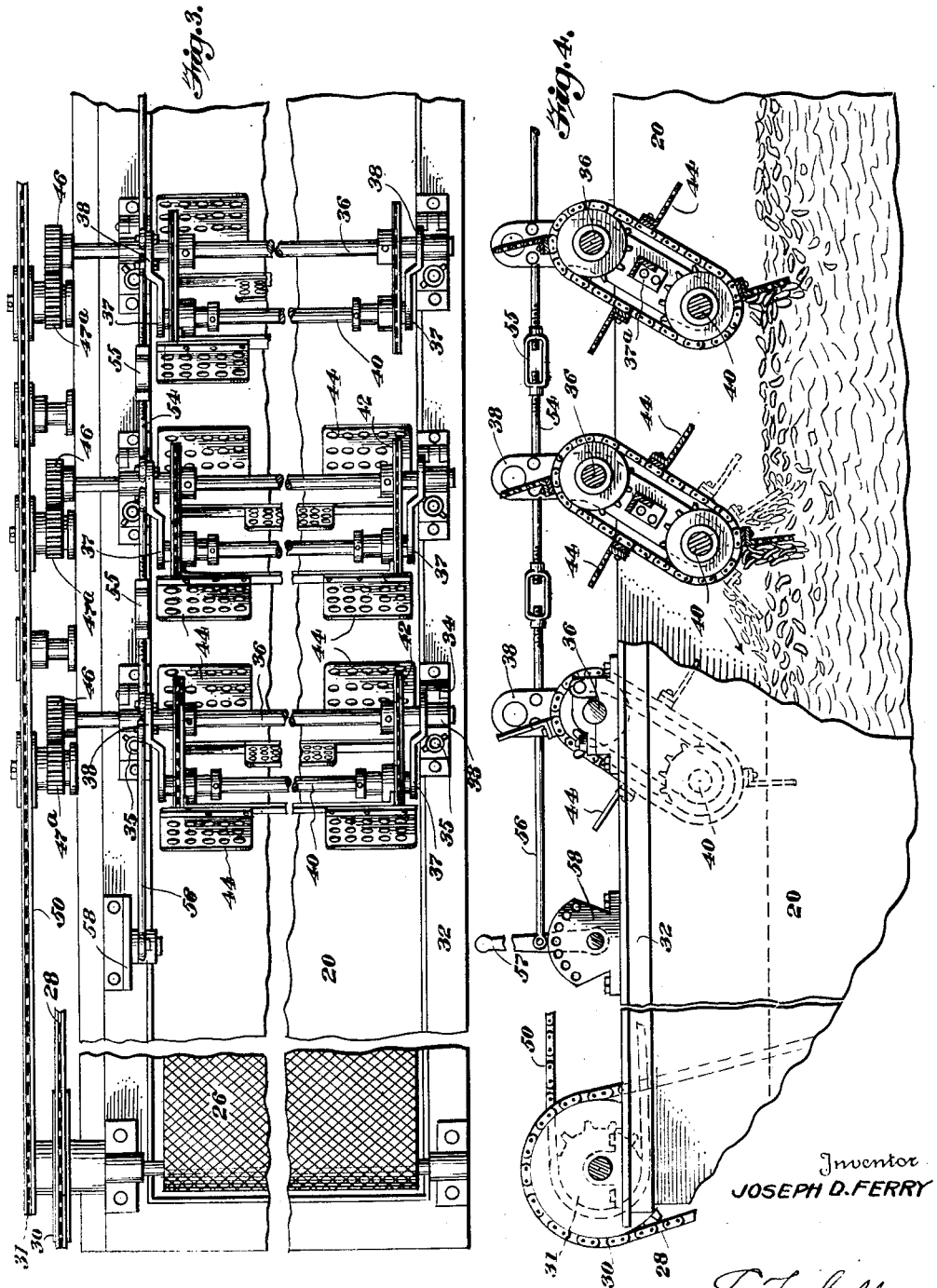
Inventor
JOSEPH D. FERRY

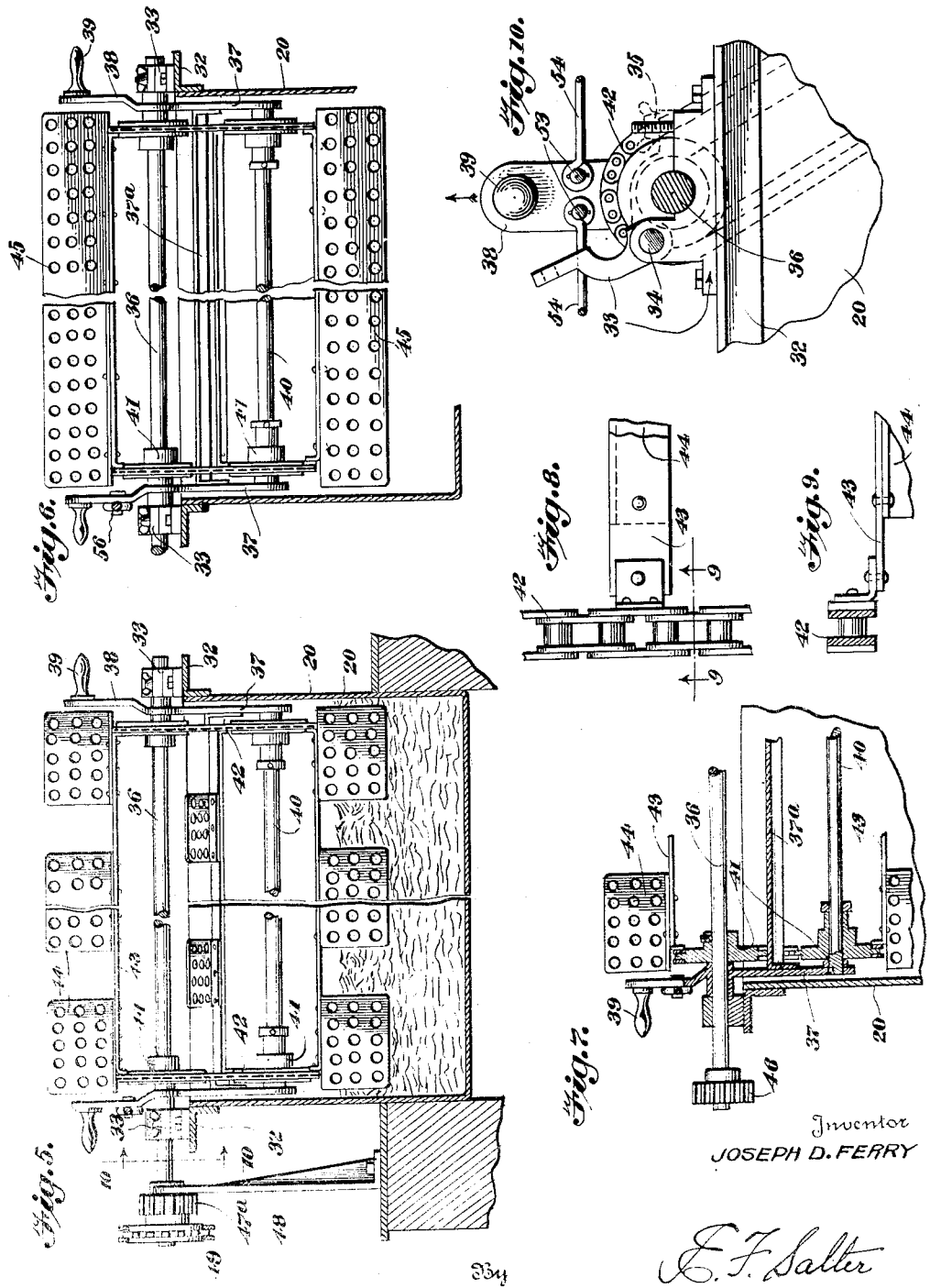

Patented Oct. 3, 1939

2,174,556

UNITED STATES PATENT OFFICE 2,174,556

COOKING APPARATUS

Joseph D. Ferry, Harrisburg, Pa.; Sylvia O. Ferry executrix of said Joseph D. Ferry, deceased Application December 3, 1936, Serial No. 114,054

13 Claims. (Cl. 53—7)

The present invention relates generally to vegetable cookers and more particularly to potato chip cooking apparatus of the type shown in my prior Patent No. 2,056,845, granted October 6, 1936, wherein the chips are advanced by mechanical means from one end of a cooking kettle in a manner to insure their delivery in properly cooked condition at the delivery end of the kettle.

In practical use various considerations have brought to light the desirability of certain improvements and in fulfilling the requirements thereof it is an important object of the present invention to provide a chip impelling mechanism by means of which the floating chips will be reversed or completely turned over and immersed in the cooking oil during the advance thereof through the kettle.

It is a further object to accomplish the reversal and submergence of the chips as many times during the course of the cooking operation, and in a degree as far at least as depth is concerned, as may be necessary to insure the desired quality of the finished product.

A still further object is to accomplish the above by a readily adjustable mechanism including a series of units which may be used in any multiples suitable to capacity, which may be easily and quickly adjusted relative to one another as well as in unison, and which may be easily and individually removed for cleaning, repairing and substitution.

These and other objects, as well as the details of construction, arrangement and operation of the several parts, will be better understood and more thoroughly appreciated from the following specification and by reference to the accompanying drawings showing an embodiment of the invention.

In the drawings which, like the detailed description, forms a part of this specification, Figure 1 is a side view, partly broken away and in section, of a cooker embodying the present improvements, Figure 2 is a partial side view looking at the opposite side with respect to Figure 1, Figure 3 is a partial top plan view, Figure 4 is an enlarged side view, partially broken away and in section, of a portion of the apparatus, Figure 5 is a vertical transverse sectional view, Figure 6 is a similar view illustrating a slight modification, Figure 7 is a vertical sectional view in detail through one side of the apparatus and one of the impelling units, Figure 8 is a detail side view of a portion of one of the impeller chains, Figure 9 is a detail sectional view taken on line 9—9 of Figure 8, and Figure 10 is a detail vertical sectional view taken on line 10—10 of Figure 5.

Referring now to the drawings and particularly to Figure 1, there is shown a potato cooker including a cooking kettle 20 into the inlet end of which the raw potato slices may be fed as by means of a feeding conveyor partially shown at 21. The kettle preferably has a sloping bottom 23 so that the cooking oil 24 increases in depth in the direction of the outlet end of the kettle. The kettle is mounted over a heating chamber indicated generally at 22 having a burner 25 disposed adjacent the inlet end of the kettle. The arrangement of the heating chamber and the manner of applying the heat to the kettle preferably corresponds to that disclosed in Figure 6 of my copending application, Serial No. 22,892, filed May 22, 1935.

With brief reference to the manner of heating the cooking liquid, it is pointed out that the location of the burner 25 adjacent the inlet end of the kettle provides for the greatest heat in this area so that the incoming raw potato slices are initially subjected to an intensely heated zone of the cooking oil for quickly sealing the chips and rendering the same buoyant, the temperature of the cooking oil gradually diminishing from the intensely heated zone toward the outlet end of the kettle to avoid scorching of the chips and to assist in the advancement thereof.

At the outlet end of the cooking kettle 20, an inclined conveyor 26 may be used to discharge the cooked chips and this conveyor is preferably operated from a variable speed driving motor 27 through a sprocket chain 28, the upper shaft 29 of the conveyor having a sprocket wheel 30 engaged by the chain 28 and also having a sprocket wheel 31 for a purpose which will presently appear.

As seen in Figures 3 to 7, inclusive, a pair of angle rails 32 are secured in outstanding relation along the upper longitudinal edges of the side walls of the kettle 20 and upon these rails at spaced points coincident with the desired stations of the several impeller units are mounted transverse bearing members of the split form shown at 33. The upper sections of these bearing members are hinged at 34 and normally held by wing nuts 35 so as to permit ready removal of the cross shafts 36 carried by the bearings.

Each cross shaft 36 extends movably through the upper portions of the side members 37 of an impeller frame, said side members having angularly extending, outwardly offset, upstanding extensions 38 at the upper ends of which are outstanding handles 39. With the extensions 38 held in upright position as presently described, the side members 37 depend into the kettle 20 at an inclination toward the discharge end thereof. The lower portions of the side members 37 have journals for the ends of a lower shaft 40 which parallels the respective cross shaft 36, and these shafts are provided adjacent to the side members with sprocket wheels 41 around which a pair of impeller chains 42 are trained.

The side members 37 of each impeller are connected by a rigid cross member of angular form at 37ª, and the chains carry at spaced points therearound cross bars 43 upon which are secured apertured impeller blades either as a series of sectional blades 44 as in Figure 5 or as single blades 45 of the lengths of the bars as in Figure 6. If of sectional form, the blades are spaced apart and arranged in staggered relation circumferentially of the impeller chains.

The impeller units may be of any desired number depending upon the desired spacing thereof as compared to the length of the kettle 20 and while I have illustrated four such impellers, it is plain more or less may be used.

Each of the upper cross shafts 36 has one extended end upon which is secured a gear 46, and each such gear is normally disposed in meshed relation with the gear 47ª of a shaft 47 journalled in the upper end of an upstanding bracket 48 and provided with a sprocket wheel 49. The several sprocket wheels 49 are engaged, as best seen in Figure 2, by a sprocket chain 50 extending from sprocket wheel 31 before mentioned, and the lower run of the chain is supported between the several impeller units, by idle supporting sprockets 51 at the upper end of supporting brackets 52.

At one side of each impeller, its respective upstanding extension 38 has laterally projecting pins 53 upon which are detachably held the apertured ends of turnbuckle rods 54 connected by turnbuckles 55 between the several impeller units, a rod 56 connecting one extension 38 to a lever 57 movable in respect to an apertured quadrant 58 to which it is normally adjustably locked. Thus by adjusting lever 57 the several impellers may be swung about the upper shafts 36 as axes to vary their depending inclination within the tank and to vary the depth of submergence of the blades 44 and 45 in the cooking oil 25.

Obviously, movement of the chain 50 connecting the several impellers with the sprocket wheel 31, serves to rotate the several shafts 36 of the impellers at a speed controlled by the variable speed motor 27 from which the movement originates. It is equally plain that rotation is transmitted to shafts 36 through gears 46 and 47ª and brings about movement of the several impeller chains 42 in the direction of the arrows in Figures 1 and 4 so that as the blades 44 or 45 dip downwardly into the cooking oil they will carry with them the adjacent floating chips whereby the chips are immersed to a depth to which the impellers are set in addition to being reversed or turned over before they slide from the blades as the latter lift from the oil.

In the above manner the chips will be gradually shifted toward the discharge end of the kettle during the cooking operation and will be immersed and turned over as many times as there are impellers to insure their arrival in properly cooked condition at the discharge conveyor 26. Moreover, the action on the impellers in thus feeding and reversing the chips is sufficiently gentle to insure a minimum of breakage.

I have before referred to the adjustment of the impellers as a series or in unison from the lever 57. Should it be necessary or desirable to adjust any one or more of the impellers with respect to the others, it is clear this may be accomplished by virtue of the turnbuckle rods 54 and turnbuckles 55.

By reason of the individual adjustment for each of the impeller units provided by the turnbuckle rods 54 and turnbuckles 55, the several units may be set or adjusted to have the blades 44 thereof dip into the cooking liquid to the same depth or to different depths. In Figure 1, the impeller adjacent the inlet end of the kettle is shown to be adjusted so that the blades thereof will dip into the cooking liquid to a greater depth than the blades of the remaining units, thereby effecting a deeper and increased period of immersion of the chips at this point.

It is a known fact that potatoes from different sources vary in the matter of frying or cooking requirements. If it is found that the potatoes from a particular source are not properly frying under a relatively shallow dipping of the impellers, the impellers may be adjusted to provide deeper dipping or immersion of the slices or chips. Also, should an oily chip, as distinguished from a dry crisp chip be desired, the impellers may be set to effect relatively deep immersion of the chips.

It will also be understood that to remove any impeller for cleansing, repairing or substitution of parts, it is merely necessary to detach its turnbuckle rods 54, release its split bearings 33 and then by grasping the handles 39 lift the same bodily from the kettle, since the gears 46 and 47ª readily separate, to permit such removal to be easily and quickly accomplished.

Having thus described the invention, what is claimed is:

1. In a cooking apparatus embodying a kettle for containing a cooking oil, a series of impellers therein for successively shifting the articles being cooked toward one end of the kettle, each of said impellers having movable blades for dipping into the oil at the lower end of the impeller and being adjustable to regulate the depth of dip of the blades, and means for adjusting the impellers individually and in unison.

2. In a cooking apparatus, an impeller mechanism consisting of a series of spaced apart vertically inclined impeller units, each having a movable endless series of outstanding blades and a shaft from which said blades are operated one end of which is provided with a gear, and a driving mechanism common to the series of impeller units by which the said gears thereof are driven.

3. In a cooking apparatus, an impeller mechanism consisting of a series of spaced apart vertically inclined impeller units, each having a movable endless series of outstanding blades and a shaft from which said blades are operated one end of which is provided with a gear, and a driving mechanism common to the series of impeller units by which the said gears thereof are driven, said shaft of each impeller unit also forming a support upon which the unit is adjustable to vary the inclination thereof.

4. In a cooking apparatus, an impeller mechanism consisting of a series of spaced apart vertically inclined impeller units, each having a movable endless series of outstanding blades, a driving mechanism common to the several units for moving said blades, adjustable connections between the several units for varying the inclination of any unit relative to the others, and an adjusting lever connected to one of the units for simultaneously varying the inclination of all of the units of the series.

5. In a cooking apparatus, an impeller mechanism consisting of a series of spaced apart, vertically inclined impeller units, each having a movable endless series of outstanding blades and a driven shaft for moving the blades forming a pivotal support upon which the unit is suspended and shiftable to vary the effective inclination thereof, supports for detachably mounting the said driven shafts, and driving means including detachable gear members on the said driven shafts permitting individual removal of the several units.

6. In a cooking apparatus, a kettle for the reception of foodstuffs and a cooking liquid, an impeller supported on and depending into the kettle and including a frame, an endless member rotatable in said frame, a series of perforated blades carried by said endless member and extending transversely of the kettle and dipping into the liquid for immersing, advancing and turning the foodstuffs completely over, arms carried by said frame and extending above the kettle, and means associated with said arms for varying the depth of the dip of said blades.

7. In a cooking apparatus, a kettle for the reception of foodstuffs in a cooking liquid, an impeller adjustably and detachably supported on the kettle and depending thereinto, said impeller including a frame, an endless member rotatable in the frame, a series of perforated blades carried by said endless members and extending transversely of the kettle and dipping into the liquid for immersing, advancing and turning the foodstuffs completely over, means for adjusting the frame to vary the depth of dip of said blades, arms carried by said frame and extending above the kettle, and handles associated with said arms to provide for the removal of said impeller upon the release of said detachable supporting means.

8. In a cooking apparatus, a kettle for containing a cooking liquid and foodstuffs, an impeller supported on the kettle and including a frame depending therein, spaced parallel shafts carried by said frame, spaced sprockets mounted upon said shafts, endless members trained about said sprockets, means for driving one of said shafts, a series of perforated blades carried by said endless members and extending transversely of the kettle and dipping into the liquid for immersing, advancing and turning the foodstuffs completely over.

9. In a cooking apparatus, a kettle for containing a cooking liquid and foodstuffs, an impeller adjustably supported on the kettle and including a frame depending therein, spaced parallel shafts carried by said frame, spaced sprockets mounted upon said shafts, endless members trained about said sprockets, means for driving one of said shafts, a series of perforated blades carried by said endless members and extending transversely of the kettle and dipping into the liquid for immersing, advancing and turning the foodstuffs completely over, and means for adjusting said frame to vary the depth of dip of said blades.

10. In a cooking apparatus, a kettle for containing a cooking oil, a substantially vertically inclined endless impeller member depending therein, a series of blades spaced apart over the extent of said member, and said impeller member being bodily movable in an arc to vary the angle at which said blades enter and leave the cooking liquid.

11. In a cooking apparatus, a kettle for containing a cooking oil, a pair of sprockets supported therein in spaced relation, an endless chain trained over said sprockets, impeller blades in spaced relation on said chain, means for driving one of said sprockets, and means for moving the other sprocket through an arc relative to the axis of said driven sprocket whereby to vary the angle at which said blades enter and leave the cooking oil.

12. In a cooking apparatus embodying a kettle for containing a cooking oil, a frame depending therein and oscillatable on an axis adjacent its upper portion, endless flexible members rotatable in the frame and having a series of outstanding blades extending transversely of the kettle, and means for shifting said frame on its axis of oscillation to vary the disposition of said blades relative to the level of cooking oil in the kettle while submerged therein.

13. In a cooking apparatus, a kettle for the reception of foodstuffs and a cooking liquid, a frame depending therein, a member rotatable in said frame on an axis parallel to and slightly above the level of the cooking liquid, an endless series of impeller blades movable over said member in radial relation thereto to dip beneath the level of cooking liquid, and said blades entering the cooking liquid radially and rearwardly of the axis of said rotatable member with respect to the direction of travel of foodstuffs and leaving the cooking liquid forwardly of and adjacent to said axis whereby to immerse, advance and completely turn over the foodstuffs beneath the surface of the cooking liquid.

JOSEPH D. FERRY.